(12) United States Patent
Hughes

(10) Patent No.: US 8,888,162 B2
(45) Date of Patent: Nov. 18, 2014

(54) UNIVERSAL ACCESSORY MOUNTING SYSTEM FOR TWO-WHEELED AND THREE-WHEELED VEHICLES

(71) Applicant: Vectrix International Limited, Kwai Chaung (HK)

(72) Inventor: Peter S. Hughes, South Harwich, MA (US)

(73) Assignee: Vectrix International Limited, Hong Kong (HK)

(*) Notice: Subject to any disclaimer, the term of this patent is extended or adjusted under 35 U.S.C. 154(b) by 0 days.

(21) Appl. No.: 14/028,688

(22) Filed: Sep. 17, 2013

(65) Prior Publication Data

US 2014/0110961 A1    Apr. 24, 2014

Related U.S. Application Data

(60) Provisional application No. 61/717,734, filed on Oct. 24, 2012.

(51) Int. Cl.
- *B62J 17/02* (2006.01)
- *B60R 7/08* (2006.01)
- *B62J 9/00* (2006.01)
- *B62K 19/46* (2006.01)

(52) U.S. Cl.
CPC . *B60R 7/08* (2013.01); *B62J 9/005* (2013.01); *B62K 19/46* (2013.01); *B62K 2202/00* (2013.01)

USPC .......................... 296/78.1; 296/37.1

(58) Field of Classification Search
USPC ........ 296/78.1, 37.1; 224/413, 416, 417, 419, 224/421, 424, 428, 429, 430, 433, 447
See application file for complete search history.

(56) References Cited

U.S. PATENT DOCUMENTS

| | | | |
|---|---|---|---|
| 8,718,300 B1* | 5/2014 | Dixon | 381/302 |
| 2001/0030438 A1* | 10/2001 | Kamemizu et al. | 296/37.1 |
| 2002/0162870 A1* | 11/2002 | Pennacchio | 224/413 |
| 2004/0124652 A1* | 7/2004 | Garrison | 296/37.1 |
| 2005/0230992 A1* | 10/2005 | Maeda et al. | 296/37.1 |
| 2008/0030041 A1* | 2/2008 | Kurihara | 296/78.1 |
| 2013/0264368 A1* | 10/2013 | Shigeta | 224/413 |

FOREIGN PATENT DOCUMENTS

| | | | |
|---|---|---|---|
| CA | 2458960 | * | 5/2007 |
| JP | 2011-57103 A | * | 3/2011 |

* cited by examiner

*Primary Examiner* — Jason S Morrow
(74) *Attorney, Agent, or Firm* — Stephen C. Beuerle; Procopio Cory Hargreaves & Savitch LLP

(57) ABSTRACT

A universal accessory mounting system for at least one of a two-wheeled vehicle and a three-wheeled vehicle including a rider area and a steering assembly including a steering tube, includes a vertical panel located in front of the rider area and aft of the steering tube, and a plurality of standard attachment features mountable to the vertical panel for mounting a plurality of different storage option accessories to the vertical panel.

12 Claims, 5 Drawing Sheets

UNIVERSAL ACCESSORY MOUNTING SYSTEM FOR TWO-WHEELED AND THREE-WHEELED VEHICLES

CROSS-REFERENCE TO RELATED APPLICATION

The present application claims priority to prior U.S. provisional patent application 61/717,734, filed Oct. 24, 2012, under 35 U.S.C. 119, and the subject matter of this prior provisional patent application is incorporated by reference herein.

FIELD OF THE INVENTION

The invention relates generally to storage systems for two-wheeled and three-wheeled vehicles and particularly to universal accessory mounting systems for two-wheeled and three-wheeled vehicles.

BACKGROUND OF THE INVENTION

Storage space and features for two-wheeled and three-wheeled vehicles (e.g., motorcycles, scooters, mopeds, stand-up cycles, trikes, etc.) is typically fixed during the design and assembly process. Storage features such as glove boxes are usually integrated with the vehicle plastics and incorporated into the tooling of the plastics. This leaves very few storage options for aftermarket opportunities and leaves the consumer to work out specific solutions for storage.

SUMMARY OF THE INVENTION

An aspect of the invention involves a universal accessory mounting system for a two-wheeled and three-wheeled vehicle that provides for storage flexibility. The universal accessory mounting system is integrated into a vertical panel located in front of a rider and aft of a steering tube of the vehicle. The vertical panel may be embodied as a fairing or as a leg shield. Accessories mountable to the universal accessory mounting system include, but not by way of limitation, a glove box, a lockable hinged glove box and open bin combination assembly, one or more bins, small open bins, a single large open bin, a large central storage bin with multiple compartments, one or more brief case hooks, one or more sunglass holders, a smart phone holder, a GPS holder, one or more cup holders, and/or one or more soft storage products (e.g., mesh and/or net product(s)). The universal accessory mounting system includes a system of standard mounting/attachment features for mounting the accessories to the vertical panel. The universal accessory mounting system may include threaded fasteners, tracks, snaps, or other fastening mechanism for mounting the accessories to the vertical panel. The universal accessory mounting system provides a wide variety of storage option accessories for the consumer. These storage option accessories can be factory installed and/or installed aftermarket. Based upon the storage option accessories available, the consumer can select the storage option accessories desired and determine the orientation/location of the storage option accessories to best match one's needs.

Another aspect of the invention involves a universal accessory mounting system for at least one of a two-wheeled vehicle and a three-wheeled vehicle including a rider area and a steering assembly including a steering tube, including a vertical panel located in front of the rider area and aft of the steering tube; and a plurality of standard attachment features mountable to the vertical panel for mounting a plurality of different storage option accessories to the vertical panel.

DETAILED DESCRIPTION OF THE PREFERRED EMBODIMENTS

Figure 1:
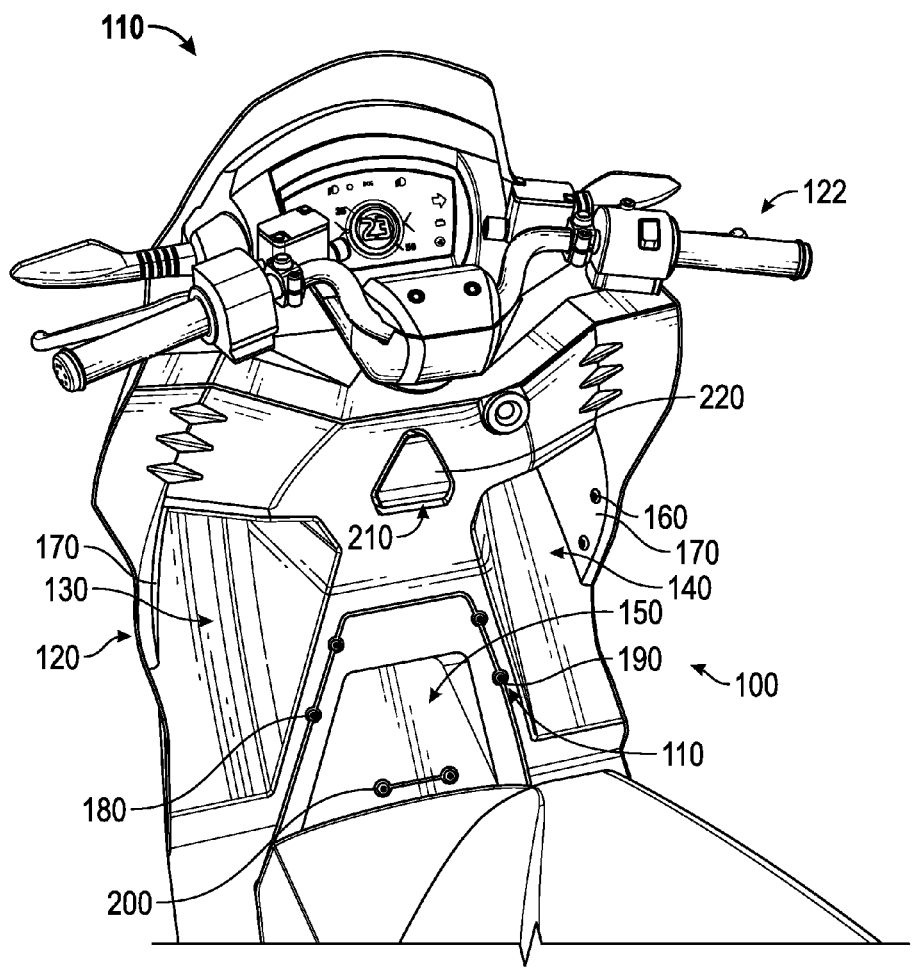
FIG. 1 is a perspective view of an exemplary embodiment of a universal accessory mounting system for a two-wheeled and three-wheeled vehicle.

With reference to FIGS. 1-5, an embodiment of a universal accessory mounting system 100 that provides for storage flexibility for a two-wheeled and three-wheeled vehicle 110 will be described. The universal accessory mounting system 100 includes and/or is integrated into a vertical panel 120 located in front of a rider, and aft of a steering tube or steering assembly of the vehicle 110. For example, the vertical panel 120 may be embodied as or integrated in a front fairing, a leg shield, or other moldings about a steering tube/steering assembly. Here, the steering tube/steering assembly is encased by the vertical panel 120. Furthermore, the vertical panel 120 may extend upward toward a set of handlebars 122 and/or downward to a floorboard. The universal accessory mounting system 100 further includes a plurality of storage option accessories configured to mount to vertical panel 120.

The vertical panel 120 may have a complex geometry. In particular, the vertical panel 120 may wrap aft or otherwise have portions that are extend further aft than other portions. In addition, the vertical panel 120 may be curved and/or include non-vertical portions. Thus, the vertical panel 120 may have only a "generally" vertical orientation (as opposed to horizontal orientation—e.g., floorboard). For example, here, the vertical panel 120 includes an upper right and upper left outer walls 170, which are both curve and generally extend in an aft direction from a forward section.

The universal accessory mounting system 100 may further include one or more cavities or recesses in the vertical panel 120. For example, in the embodiment shown, the universal accessory mounting system 100 includes an upper-left molded recess-forming section 130, an upper-right molded recess-forming section 140, and a lower central molded recess-forming section 150 in the vertical panel 120. In other embodiments, the universal accessory mounting system 100 may include greater or fewer recess-forming sections. Moreover, in other embodiments, the recess-forming sections may be arranged differently than as illustrated in the embodiment of the figures.

In addition, the cavities or recesses in the vertical panel 120 may be coordinated for use with one or more of the storage option accessories. In particular, the plurality of storage option accessories may be configured to interface with one or more cavities or recesses, extending the storage capacity of the storage option accessory. For example, a bottom surface and/or a side surface of an individual storage option accessory may extend into a recess-forming section. In addition, the bottom and/or a side surface may be affirmatively mounted to one or more attachment points within the recess-forming section. For example, as illustrated, the upper right and upper left outer walls 170 may include attachment points (e.g., threaded holes) such that an individual storage option accessory may affirmatively attach therein. Also for example, other walls of the recess-forming section may include attachment points. Alternately, the bottom and/or a side surface may be mounted or interfaced using lips, ledges, slots, or other fastening mechanism mounting/attachment features.

The universal accessory mounting system 100 includes a set of attachment points 110 integrated into the vertical panel 120. In particular, the set of attachment points 110 may be a plurality of mounting receivers in the vertical panel 120 configured to engage and support a plurality of the storage option accessories individually. Moreover, the set of attachment points 110 are exposed or otherwise accessible to a rider. For example, as illustrated, the set of attachment points 110 may include threaded receivers configured to receive threaded fasteners. Similarly, non-threaded receivers may be used (e.g., receivers for hooks, clips, quick-release pins, etc.).

Also, the set of attachment points one or more may include covers such as plugs or flaps for periods when not in use, which are readily removable by the rider. Similarly, fasteners may be left installed in the unused attachment points as readily removable covers. Thus, when an attachment point is abandoned, the threaded slot/hole is preferably closed by an appropriately styled and functional blank or plug.

The set of attachment points 110 are configured to receive a plurality of storage option accessories. In particular, the set of attachment points 110 may include a greater number of attachment points than needed for a single storage option. For example, as illustrated, the set of attachment points 110 may be grouped into pairs of attachment points distributed about the entire vertical panel 120. Also, greater numbers of groupings may be used (e.g., providing for additional configurations, additional weight/support requirements, redundancy, etc.).

According to one embodiment, a pair of upper-right section and upper-left section threaded fasteners (e.g., bolts) 160 are threadably engaged within threaded holes in the upper right and upper left outer walls 170. First, second, and third sets of central section threaded fasteners 180, 190, and 200 are threadably engaged within threaded holes/slots in the area of the lower central molded recess-forming section 150.

Accordingly to another embodiment, the storage option accessories may attach to the front of the vehicle 110. In particular, although the threaded fasteners 160, 180, 190, 200 are shown as screwing into the vertical panel 120 to attach the storage option accessories from the back side of the vertical panel 120, in an alternative embodiment, the threaded fasteners 160, 180, 190, 200 screw into the vertical panel 120 to attach the storage option accessories from the front/exterior side of the vertical panel 120. Thus, the threaded fasteners 160, 180, 190, 200 may engage from either the front or the aft side of the vertical panel 120.

Although the universal accessory mounting system 100 is shown having threaded fasteners as standard mounting/attachment features for mounting accessories to the vertical panel 120, in alternative embodiments, the universal accessory mounting system 100 may include, but not by way of limitation, one or more of tracks, hooks, slots, snaps, rivets, plugs, or other fastening mechanism mounting/attachment features for mounting the accessories to the vertical panel 120. Accordingly, the set of attachment points 110 will correspond to the fasteners used.

In addition to the storage option accessories, the vertical panel 120 may include accessories common to all configurations. For example, the vertical panel 120 may include a hook 210. In particular, the hook 210 may be a retractable cargo/helmet/briefcase hook 210. According to one embodiment, the hook 210 may include a triangular section 220 hingeably attached to an upper central part of the vertical panel 120. The hook 210 may be configured to rotate to an open position by pulling on a top most part of the triangular section 220.

As discussed above, the universal accessory mounting system 100 provides for storage flexibility and is configured to receive a plurality of storage option accessories. In particular, each storage option accessory may be readily-removably mounted such that a rider may readily disengage a first storage option accessory and engage a storage second accessory ("plug and play"). For example, a storage option accessory may be readily engaged/disengaged where it can be both removed and installed with hand tools (e.g., pliers, screwdrivers, wrenches, keys, levers, etc.). Also, for example, a storage option accessory may be readily engaged/disengaged where disposable fasteners or interface devices (e.g., disposable plastic clips, cotter pins, etc.) are used/consumed and replaced. Moreover, the first and the second storage option accessory may mount to the vertical panel 120 using the same attachment points, different attachment points, or a combination thereof.

The accessories mountable to the universal accessory mounting system 100 include, but not by way of limitation, a glove box, a lockable hinged glove box and open bin combination assembly, one or more bins, small open bins, a single large open bin, a large central storage bin with multiple compartments, one or more brief case/cargo/helmet hooks, one or more sunglass holders, a smart phone holder, a GPS holder, one or more cup holders, and/or one or more soft storage products (e.g., mesh and/or net product(s)). FIGS. 2-5 show some example storage option accessories 250, 300, 310, 320, 330, 340 that may be mountable to the universal accessory mounting system 100.

Figure 2:
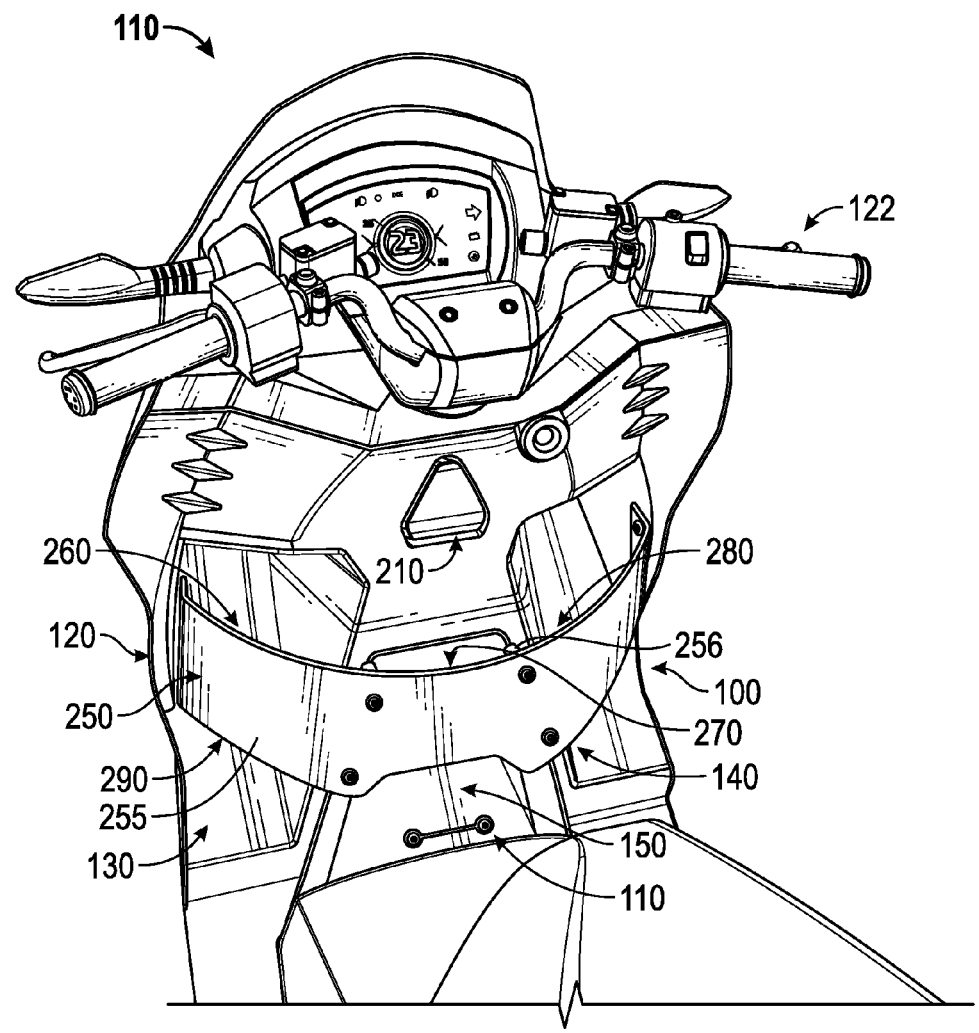
FIG. 2 is a perspective view of an exemplary embodiment of a single large open bin storage option accessory mounted to the universal accessory mounting system.

FIG. 2 is an embodiment of a storage option accessory 250 including an open bin. In particular, the storage option accessory 250 may include a partially enclosed area (e.g., open top), wherein the storage option accessory 250 is readily-removably mounted to the vertical panel 120 via a plurality of attachment points. For example, a single large open bin storage option accessory 250 is illustrated mounted to the set of attachment points 110 of the universal accessory mounting system 100. Here, the open bin storage option accessory 250 includes three open-top storage compartments 260, 270, 280 corresponding to the upper-left molded recess-forming section 130, the upper-right molded recess-forming section 140, and the lower central molded recess-forming section 150. The three open-top storage compartments 260, 270, 280 may be bound by a single or common aft wall 255 and a bottom surface 290.

In addition, a storage option accessory may include one or more extenders 256, which attached to one or more of the set of attachment points 110 and to the storage option accessory 250. For example, the extenders 256 may be used provide even greater storage area. For example here the single large open bin storage option accessory 250 includes four extenders 256 interspersed between the aft wall 255 and four corresponding attachment points on the vertical panel 120. Alternately, the single large open bin storage option accessory 250 may include two extenders 256 instead of the four, wherein the extenders 256 extend from the bottom surface to an upper portion of the aft wall 255, and are further configured as dividers within the single large open bin. In either case, the aft wall 255 may be offset from the vertical panel 120.

As discussed above, a bottom surface and/or a side surface of an individual storage option accessory may extend into a recess-forming section. Here, each open-top storage compartments 260, 270, 280 share the bottom surface 290, which extends to the respective recess-forming section to form the single bin having an open top. Moreover, here, with extenders 256, the shared bottom surface 290 also extends outward from the respective recess-forming sections 130, 140, 150 and further aft from the vertical panel 120 to the aft wall 255.

According to one embodiment, the storage option accessory 250 may include one or more openings configure to reduce or eliminate the collection of liquids or particulate matter. In particular, the bottom surface 290 may include one or more drains. For example, as illustrated here, the bottom surface 290 may be a ventered to allow for drainage.

Figure 3:
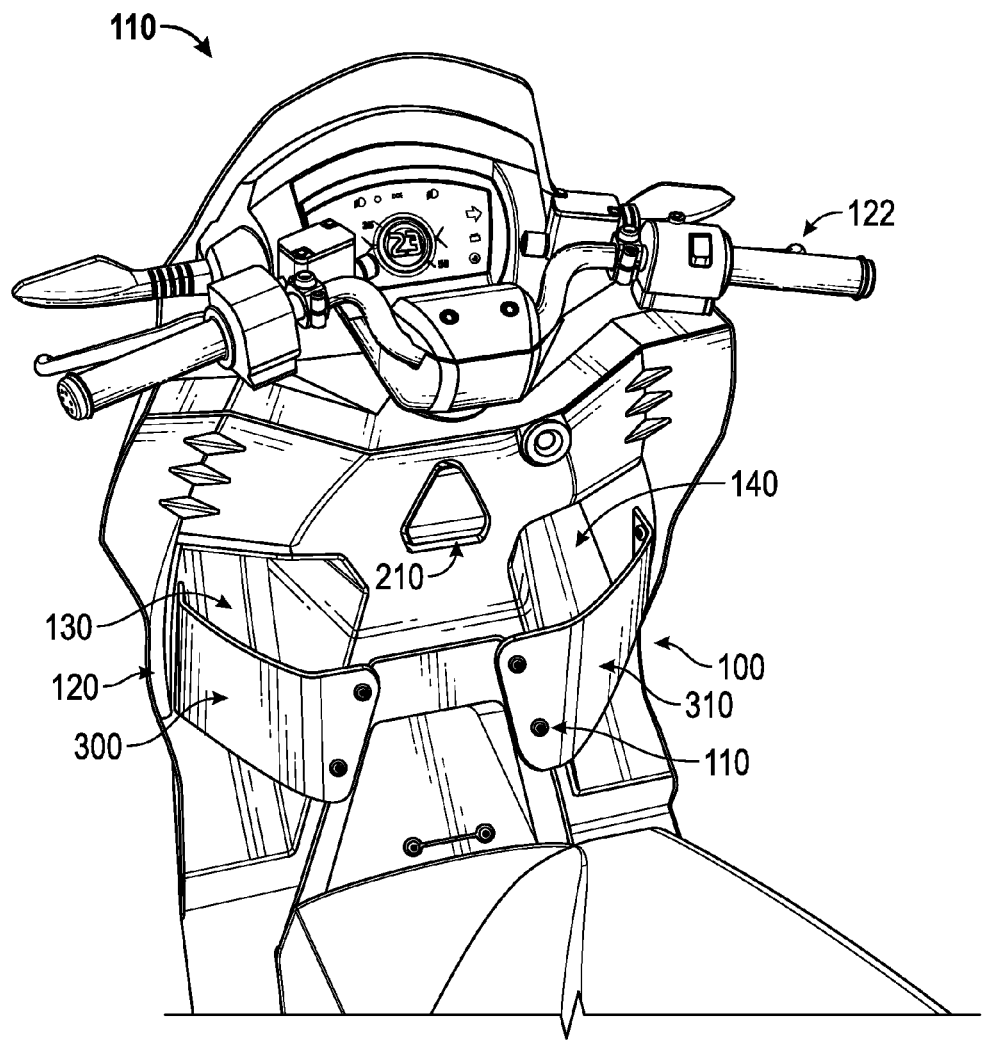
FIG. 3 is a perspective view of an exemplary embodiment of a pair of individual open bin storage option accessories mounted to the universal accessory mounting system.

FIG. 3 is an embodiment of storage option accessories 300, 310 in the form of a plurality of open bins. In particular, each storage option accessory 300, 310 may include a partially enclosed area (e.g., open top), wherein the storage option accessory 300, 310 is readily-removably mounted to the vertical panel 120 via a plurality of attachment points. For example the pair of individual open bin storage option accessories 300, 310 corresponding to the upper-left molded recess-forming section 130 and the upper-right molded recess-forming section 140 are illustrated individually mounted to a set of attachment points 110 of the universal accessory mounting system 100. Moreover, here, the individual open bin storage option accessories 300, 310 each interface with their respective molded recess-forming section forming an individual pocket area on each side of the steering tube/steering assembly.

Figure 4:
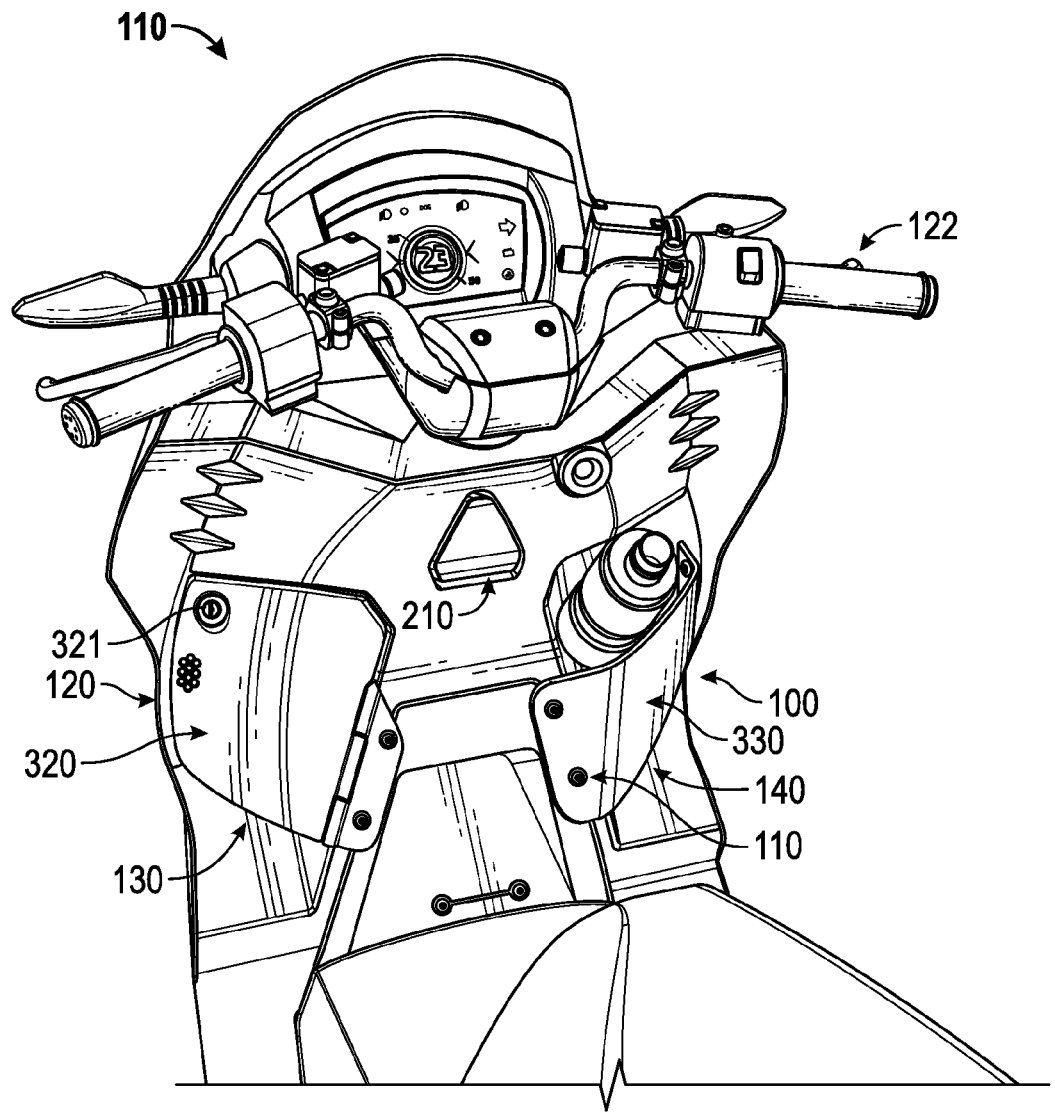
FIG. 4 is a perspective view of an exemplary embodiment of a lockable hinged glove box storage option accessory and an individual open bin storage option accessory mounted to the universal accessory mounting system.

FIG. 4 is an embodiment of a storage option accessory 320 including a closeable and lockable storage compartment. In particular, the storage option accessory 320 may include an enclosed area that may be accessed and secured, wherein the storage option accessory 320 is readily-removably mounted to the vertical panel 120 via a plurality of attachment points. For example, the lockable hinged glove box storage option accessory 320 corresponding to the upper-left molded recess-forming section 130 is illustrated individually mounted to a set of attachment points 110 of the universal accessory mounting system 100. Moreover, the lockable hinged glove box storage option accessory 320 may include a key lock 321 configured to secure and access the enclosed area.

According to one embodiment, the individual compartments may be combined. In particular, storage option accessories may include both an open compartment and a closed secured compartment. For example, as illustrated, an individual open bin storage option accessory 330 corresponding to the upper-right molded recess-forming section 140 may be individually mounted to the set of attachment points 110 of the universal accessory mounting system 100, alongside the lockable and closeable hinged glove box storage option accessory 320 corresponding to the upper-left molded recess-forming section 130. The individual open bin storage option accessory 330 may be substantially similar to the of individual open bin storage option accessory 310 in FIG. 3.

Figure 5:
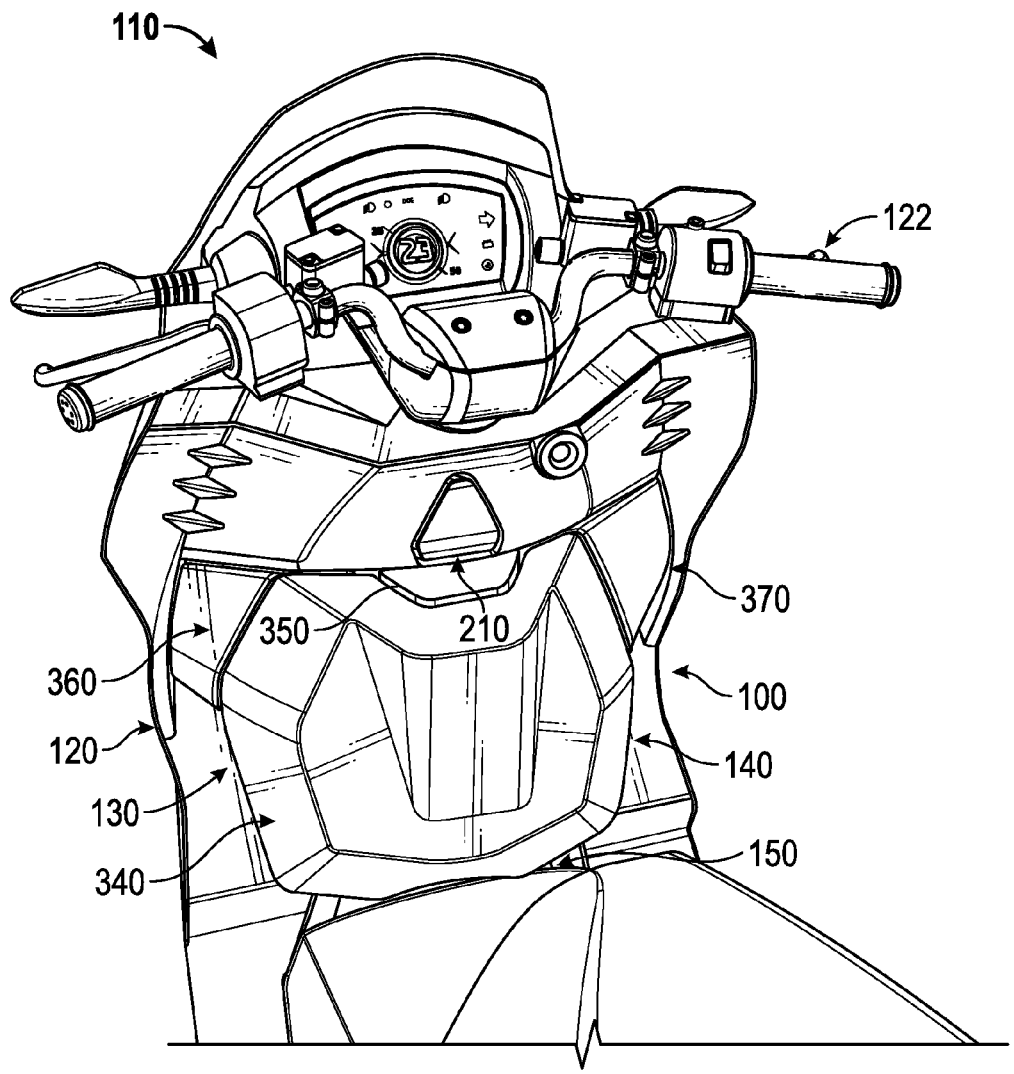
FIG. 5 is a perspective view of an exemplary embodiment of a single large central closed storage bin storage option accessory mounted to the universal accessory mounting system.

FIG. 5 is an embodiment of a storage option accessory 340 including a closed bin. In particular, the storage option accessory 340 may include an enclosed area, wherein the storage option accessory 340 is readily-removably mounted to the vertical panel 120 via a plurality of attachment points. For example, the single large central closed storage bin storage option accessory 340 is illustrated mounted to a set of attachment points (not shown) of the universal accessory mounting system 100.

According to one embodiment, the central closed storage bin option accessory 340 may include multiple interior storage compartments corresponding to the upper-left molded recess-forming section 130, the upper-right molded recess-forming section 140, and the lower central molded recess-forming section 150. Moreover, trim panels 360, 370 corresponding to the upper-left molded recess-forming section 130 and the upper-right molded recess-forming section 140 may be disposed along opposite upper portions of the central closed storage bin option accessory 340.

According to one embodiment, the central closed storage bin storage option accessory 340 may include quick release. Moreover, the quick release may be lockable. For example, as illustrated, the central closed storage bin storage option accessory 340 may include a pressable release mechanism 350 for unlocking/opening the central closed storage bin storage option accessory 340 relative to the vertical panel 120. In addition, the central closed storage bin storage option accessory 340 may be hingeably attached to the vertical panel 120 opposite the pressable release mechanism 350. For example, here, the central closed storage bin storage option accessory 340 may be hingeably attached to the vertical panel 120 adjacent a bottom of the accessory 340.

Thus, the universal accessory mounting system 100 provides a wide variety of "plug and play" storage option accessories for the consumer. These storage option accessories can be factory installed and/or installed aftermarket. Based upon the storage option accessories available, the consumer can select the storage option accessories desired and determine the orientation/location of the storage option accessories to best match one's needs. The standard mounting/attachment features allow the mounting accessories to be easily removable/replaceable with different mounting accessories.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items e present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed:

1. A universal accessory mounting system for at least one of a two-wheeled vehicle and a three-wheeled vehicle including a rider area and a steering assembly including a steering tube, the universal accessory mounting system comprising:
a vertical panel located in front of the rider area and aft of the steering tube; and
a plurality of standard attachment features mountable to the vertical panel for mounting a plurality of different storage option accessories to the vertical panel, wherein the universal accessory mounting system includes an upper-left molded recess-forming section, an upper-right molded recess-forming section, and a lower central molded recess-forming section.

2. The universal accessory mounting system of claim 1, wherein the plurality of standard attachment features includes a pair of upper-right section and upper-left section threaded holes and threaded fasteners and first, second, and third sets of central section threaded holes and threaded fasteners.

3. The universal accessory mounting system of claim 1, wherein the plurality of standard attachment features includes at least one of threaded fasteners, tracks, hooks, slots, snaps, rivets, and plugs.

4. The universal accessory mounting system of claim 1, wherein the vertical panel includes a cargo hook.

5. The universal accessory mounting system of claim 1, wherein the plurality of different storage option accessories includes at least two of a glove box, a lockable hinged glove box and open bin combination assembly, one or more bins, small open bins, a single large open bin, a large central storage bin with multiple compartments, one or more sunglass holders, a smart phone holder, a GPS holder, one or more cup holders, and one or more soft storage products.

6. A universal accessory mounting system for a motorized cycle having handlebars, a steering assembly, and a rider area, the universal accessory mounting system comprising:
a fairing configured to attach to a forward end of the motorized cycle below the handlebars, the fairing including a vertical panel, the vertical panel located in front of the rider area and aft of the steering assembly, the vertical panel including a set of attachment points; and
a storage option accessory configured to mount to the vertical panel via at least a portion of the set of attachment points,
wherein the fairing includes
a first recess-forming section in the vertical panel, the first recess-forming section at least partially bound by an upper right outer wall, the upper right outer wall including one or more of the set of attachment points;
a second recess-forming section in the vertical panel, the second recess-forming section at least partially bound by an upper left outer wall, the upper left outer wall including one or more of the set of attachment points; and
a third recess-forming section in the vertical panel, the third recess-forming section located at least partially between the first recess-forming section and the second recess-forming section, the third recess-forming section including one or more of the set of attachment points.

7. The universal accessory mounting system of claim 6, wherein the fairing includes a recess-forming section in the vertical panel, the recess-forming section including one or more of the set of attachment points.

8. The universal accessory mounting system of claim 6, wherein one or more of the set of attachment points are located on the vertical panel between the first recess-forming section the third recess-forming section, and one or more of the set of attachment points are located on the vertical panel between the second recess-forming section the third recess-forming section.

9. The universal accessory mounting system of claim 6, wherein the storage option accessory is readily-removably mounted to the fairing via the portion of the set of attachment points, the storage option accessory including at least one open top storage compartment.

10. The universal accessory mounting system of claim 6, wherein the storage option accessory is readily-removably mounted to the fairing via the portion of the set of attachment points, the storage option accessory including at least one closeable and lockable storage compartment.

11. The universal accessory mounting system of claim 6, wherein the storage option accessory is readily-removably mounted to the fairing via the portion of the set of attachment points, the storage option accessory including a closed bin and a quick release for opening the closed bin.

12. The universal accessory mounting system of claim 11, wherein the closed bin is hingeably attached to the vertical panel opposite the quick release, and the closed bin includes a plurality of interior storage compartments.

* * * * *